(12) United States Patent
Joseph et al.

(10) Patent No.: US 10,820,326 B2
(45) Date of Patent: Oct. 27, 2020

(54) RESOURCE ALLOCATION FOR RESERVED RESOURCES

(71) Applicant: QUALCOMM Incorporated, San Diego, CA (US)

(72) Inventors: Vinay Joseph, San Diego, CA (US); Srinivas Yerramalli, San Diego, CA (US); Rajat Prakash, San Diego, CA (US); Aleksandar Damnjanovic, Del Mar, CA (US); Prashanth Haridas Hande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/695,017

(22) Filed: Nov. 25, 2019

(65) Prior Publication Data

US 2020/0170019 A1  May 28, 2020

Related U.S. Application Data

(60) Provisional application No. 62/772,519, filed on Nov. 28, 2018.

(51) Int. Cl.
*H04W 72/10* (2009.01)
*H04W 72/04* (2009.01)

(52) U.S. Cl.
CPC ..... *H04W 72/0493* (2013.01); *H04W 72/042* (2013.01); *H04W 72/10* (2013.01)

(58) Field of Classification Search
CPC ............ H04W 72/0493; H04W 72/042; H04W 72/10
See application file for complete search history.

(56) References Cited

U.S. PATENT DOCUMENTS 8,428,606 B1 * 4/2013 Vrzic ............... H04W 72/0406
370/335
2006/0264218 A1 * 11/2006 Zhang ............... H04L 27/2627
455/450

(Continued)

OTHER PUBLICATIONS

Intel Corporation: "On Resource Reservation for Forward Compatibility", 3GPP Draft, 3GPP TSG RAN WG1 Meeting #90, R1-1714084 Intel Reserved Resource, 3rd Generation Partnership Project (3GPP), Mobile Competence Centre, 650, Route Des Lucioles, F-06921 Sophia-Antipolis Cedex, France, vol. RAN WG1, No. Prague, P. R. Czechia, Aug. 21, 2017-Aug. 25, 2017, Aug. 20, 2017 (Aug. 20, 2017), XP051316874, 4 Pages, Retrieved from the Internet: URL: http://www.3gpp.org/ftp/Meetings_3GPP_SYNC/RAN1/Docs/ [retrieved on Aug. 20, 2017], Chapters 2.1, 2.2 and 3. 0.

(Continued)

*Primary Examiner* — Julio R Perez (74) *Attorney, Agent, or Firm* — Harrity & Harrity, LLP (57) ABSTRACT

Various aspects of the present disclosure generally relate to wireless communication. In some aspects, a user equipment may receive information identifying a reserved resource allocation, wherein the reserved resource allocation is associated with a reserved resource; receive information identifying another resource allocation, wherein the other resource allocation overlaps with the reserved resource allocation at an overlapped portion; and selectively perform a communication using the overlapped portion for the reserved resource allocation or the other resource allocation based at least in part on at least one of: respective traffic types of the reserved resource allocation and the other resource allocation, or respective priority levels associated with the reserved resource allocation and the other resource allocation. Numerous other aspects are provided.

30 Claims, 6 Drawing Sheets

(56) References Cited

U.S. PATENT DOCUMENTS

| | | | | |
|---|---|---|---|---|
| 2014/0086162 A1* | 3/2014 | Rimini | .................... | H04B 1/10 |
| | | | | 370/329 |
| 2014/0112194 A1* | 4/2014 | Novlan | ................ | H04W 48/16 |
| | | | | 370/254 |
| 2018/0084429 A1* | 3/2018 | Guo | ..................... | H04W 16/14 |
| 2018/0176935 A1 | 6/2018 | Li et al. | | |

OTHER PUBLICATIONS

International Search Report and Written Opinion—PCT/US2019/063201—ISA/EPO—Mar. 3, 2020.

Samsung: "Indication of Reserved Resources", 3GPP Draft, 3GPP TSG Ran WG1 Meeting NR#3, R1-1716020 Reserved Resource_Final, 3rd Generation Partnership Project [3GPP], Mobile Competence Centre, 650, Route Des Lucioles, F-06921 Sophia-Anti Polis Cedex, France, vol. RAN WG1. No. Nagoya, Japan, Sep. 18, 2017—Sep. 21, 2017, Sep. 17, 2017 (Sep. 17, 2017), XP051339479, pp. 1-6, Retrieved from the Internet: URL: http://www.3gpp.org/ftp/Meetings_3GPP_SYNC/RAN1/Docs / [retrieved on Sep. 17, 2017], Chapters 1 and 2.

\* cited by examiner

RESOURCE ALLOCATION FOR RESERVED RESOURCES

CROSS-REFERENCE TO RELATED APPLICATION

This application claims priority to U.S. Provisional Patent Application No. 62/772,519, filed on Nov. 28, 2018, entitled "RESOURCE ALLOCATION FOR RESERVED RESOURCES," which is hereby expressly incorporated by reference herein.

FIELD OF THE DISCLOSURE

Aspects of the present disclosure generally relate to wireless communication, and to techniques and apparatuses for resource allocation for reserved resources.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving information identifying a reserved resource allocation, wherein the reserved resource allocation is associated with a reserved resource; receiving information identifying another resource allocation, wherein the other resource allocation overlaps with the reserved resource allocation at an overlapped portion; and selectively performing a communication using the overlapped portion for the reserved resource allocation or the other resource allocation based at least in part on at least one of: respective traffic types of the reserved resource allocation and the other resource allocation, or respective priority levels associated with the reserved resource allocation and the other resource allocation.

In some aspects, a UE for wireless communication may include memory and one or more processors operatively coupled to the memory. The memory and the one or more processors may be configured to receive information identifying a reserved resource allocation, wherein the reserved resource allocation is associated with a reserved resource; receive information identifying another resource allocation, wherein the other resource allocation overlaps with the reserved resource allocation at an overlapped portion; and selectively perform a communication using the overlapped portion for the reserved resource allocation or the other resource allocation based at least in part on at least one of: respective traffic types of the reserved resource allocation and the other resource allocation, or respective priority levels associated with the reserved resource allocation and the other resource allocation.

In some aspects, a non-transitory computer-readable medium may store one or more instructions for wireless communication. The one or more instructions, when executed by one or more processors of a UE, may cause the one or more processors to receive information identifying a reserved resource allocation, wherein the reserved resource allocation is associated with a reserved resource; receive information identifying another resource allocation, wherein the other resource allocation overlaps with the reserved resource allocation at an overlapped portion; and selectively perform a communication using the overlapped portion for the reserved resource allocation or the other resource allocation based at least in part on at least one of: respective traffic types of the reserved resource allocation and the other resource allocation, or respective priority levels associated with the reserved resource allocation and the other resource allocation.

In some aspects, an apparatus for wireless communication may include means for receiving information identifying a reserved resource allocation, wherein the reserved resource allocation is associated with a reserved resource; means for receiving information identifying another resource allocation, wherein the other resource allocation overlaps with the reserved resource allocation at an overlapped portion; and means for selectively performing a communication using the overlapped portion for the reserved resource allocation or the other resource allocation based at least in part on at least one of: respective traffic types of the reserved resource allocation and the other resource allocation, or respective priority levels associated with the reserved resource allocation and the other resource allocation.

In some aspects, a method of wireless communication, performed by a base station, may include transmitting information identifying a reserved resource allocation, wherein the reserved resource allocation is associated with a reserved resource for a first communication; mapping resources for a second communication associated with another resource allocation, wherein the resources for the second communication at least partially overlap the reserved resource at an overlapped portion; and selectively performing the first communication or the second communication using the overlapped portion based at least in part on at least one of: respective traffic types of the reserved resource allocation and the other resource allocation, or respective priority levels associated with the reserved resource allocation and the other resource allocation.

In some aspects, a base station for wireless communication may include memory and one or more processors operatively coupled to the memory. The memory and the one or more processors may be configured to transmit information identifying a reserved resource allocation, wherein the reserved resource allocation is associated with a reserved resource for a first communication; map resources for a second communication associated with another resource allocation, wherein the resources for the second communication at least partially overlap the reserved resource at an overlapped portion; and selectively perform the first communication or the second communication using the overlapped portion based at least in part on at least one of: respective traffic types of the reserved resource allocation and the other resource allocation, or respective priority levels associated with the reserved resource allocation and the other resource allocation.

In some aspects, a non-transitory computer-readable medium may store one or more instructions for wireless communication. The one or more instructions, when executed by one or more processors of a base station, may cause the one or more processors to transmit information identifying a reserved resource allocation, wherein the reserved resource allocation is associated with a reserved resource for a first communication; map resources for a second communication associated with another resource allocation, wherein the resources for the second communication at least partially overlap the reserved resource at an overlapped portion; and selectively perform the first communication or the second communication using the overlapped portion based at least in part on at least one of: respective traffic types of the reserved resource allocation and the other resource allocation, or respective priority levels associated with the reserved resource allocation and the other resource allocation.

In some aspects, an apparatus for wireless communication may include means for transmitting information identifying a reserved resource allocation, wherein the reserved resource allocation is associated with a reserved resource for a first communication; means for mapping resources for a second communication associated with another resource allocation, wherein the resources for the second communication at least partially overlap the reserved resource at an overlapped portion; and means for selectively performing the first communication or the second communication using the overlapped portion based at least in part on at least one of: respective traffic types of the reserved resource allocation and the other resource allocation, or respective priority levels associated with the reserved resource allocation and the other resource allocation.

Aspects generally include a method, apparatus, system, computer program product, non-transitory computer-readable medium, user equipment, base station, wireless communication device, and processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
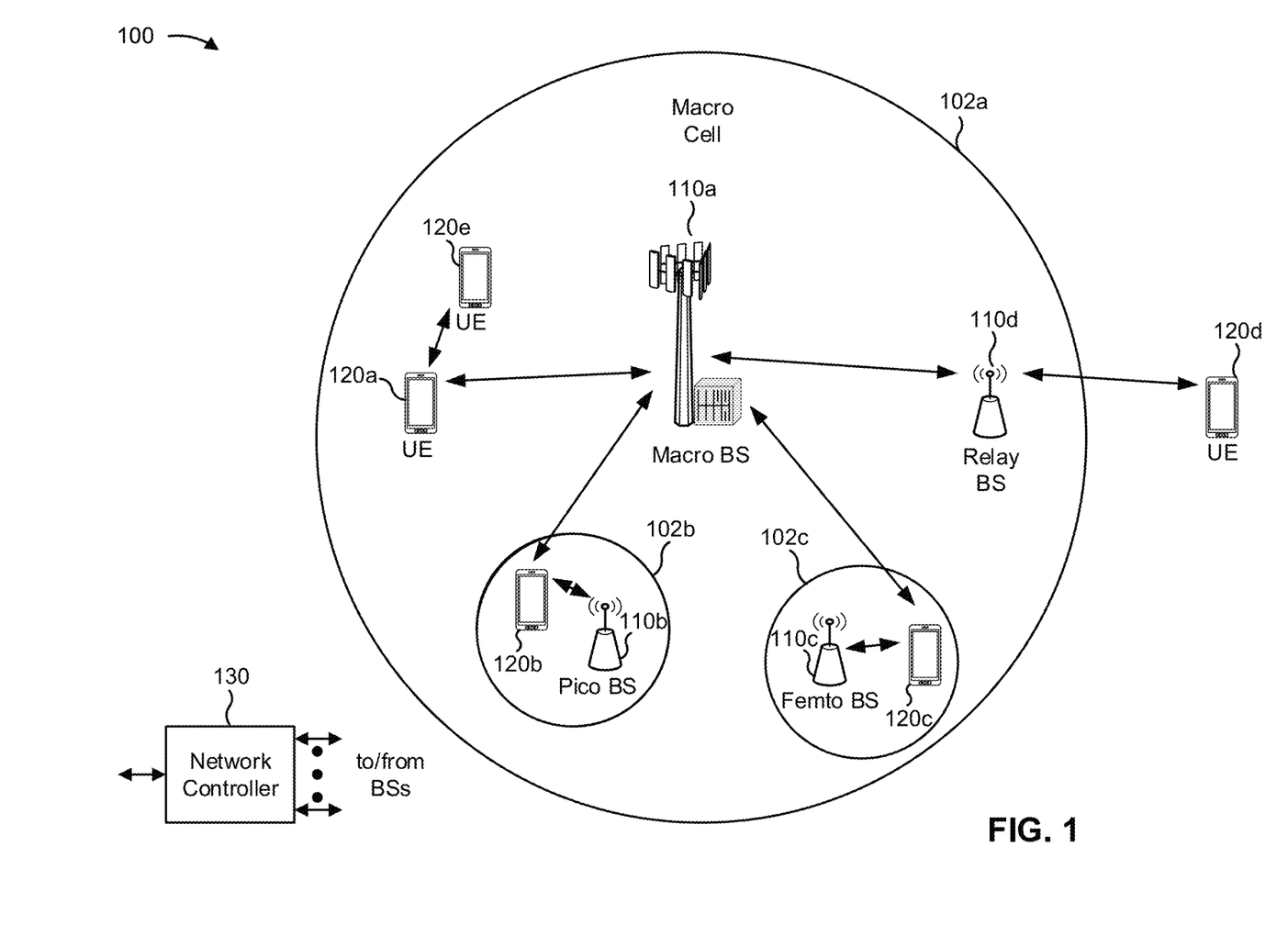
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
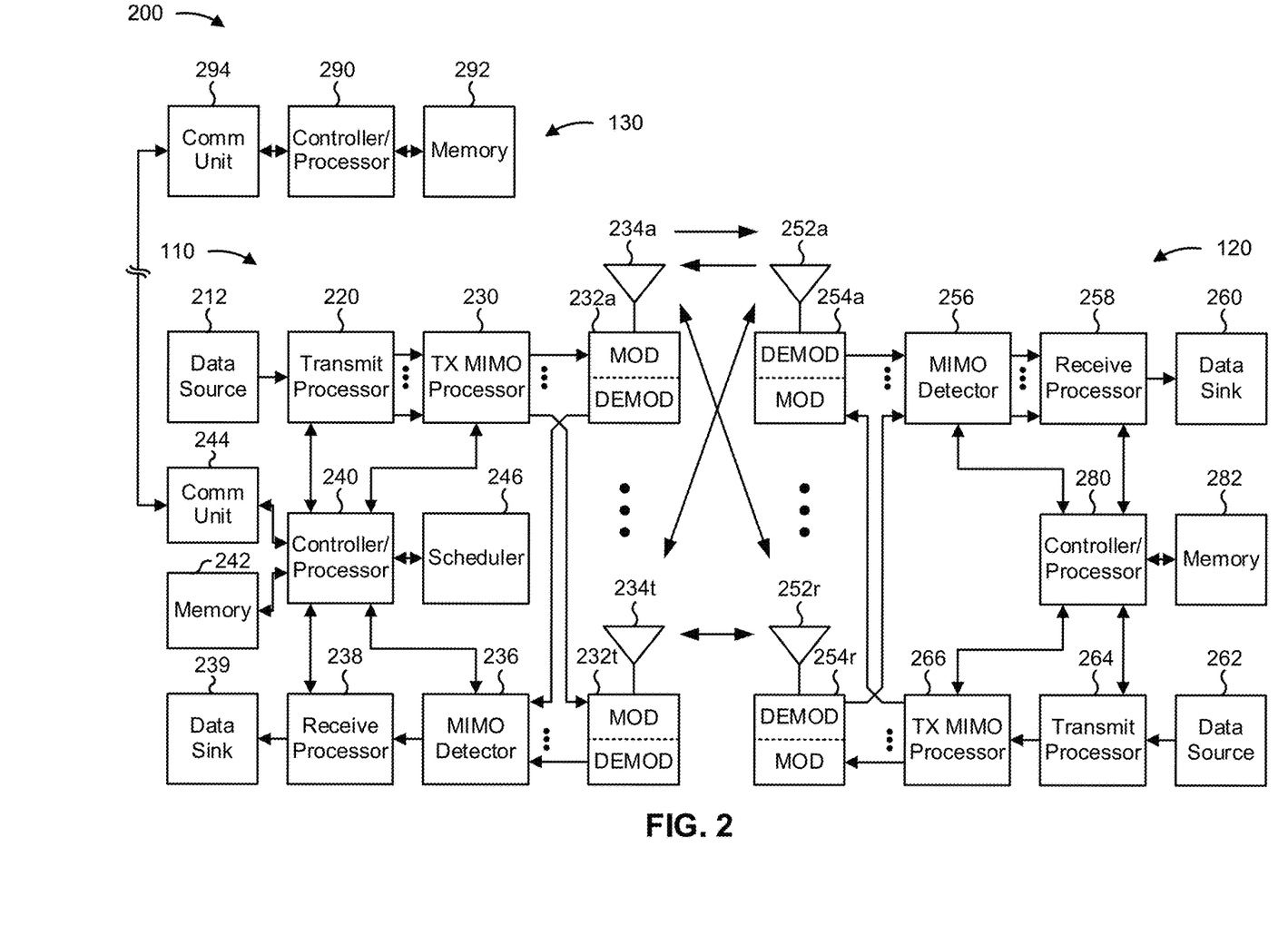
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with resource allocation for reserved resources, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving information identifying a reserved resource allocation, wherein the reserved resource allocation is associated with a reserved resource; means for receiving information identifying another resource allocation, wherein one or more resources associated with the other resource allocation overlap at least part of the reserved resource allocation; means for transmitting or receiving a communication based at least in part on the other resource allocation, wherein the communication is transmitted or received without using the at least part of the reserved resource allocation; means for receiving the information identifying the reserved resource allocation in a system information broadcast; means for receiving the information identifying the reserved resource allocation in a radio resource control message, wherein the reserved resource allocation is for a downlink communication or an uplink communication; means for receiving the information identifying the reserved resource allocation in a Layer 2 message; means for receiving the information identifying the reserved resource allocation in a Layer 1 message; means for transmitting or receiving the communication without using the at least part of the reserved resource allocation based at least in part on an explicit indication indicating whether the communication is to be transmitted without using any resource of the reserved resource allocation; means for selectively performing a communication using the overlapped portion for the reserved resource allocation or the other resource allocation based at least in part on at least one of: respective traffic types of the reserved resource allocation and the other resource allocation, or respective priority levels associated with the reserved resource allocation and the other resource allocation; and/or the like. In some aspects, such means may include one or more components of UE 120 described in connection with FIG. 2.

In some aspects, base station 110 may include means for transmitting information identifying a reserved resource allocation, wherein the reserved resource allocation is associated with a reserved resource; means for mapping resources for a communication, wherein the resources for the communication at least partially overlap the reserved resource; means for transmitting or receiving the communication, wherein the communication is transmitted or received without using the reserved resource; means for transmitting the information identifying the reserved resource allocation in a system information broadcast; means for transmitting the information identifying the reserved resource allocation in a radio resource control message, wherein the reserved resource allocation is for a downlink communication or an uplink communication; means for transmitting the information identifying the reserved resource allocation in a Layer 2 message; means for transmitting the information identifying the reserved resource allocation in a Layer 1 message; means for transmitting or receiving the communication without using the reserved resource based at least in part on an explicit indication indicating whether the communication is to be transmitted without using any resource of the reserved resource allocation; means for selectively performing the first communication or the second communication using the overlapped portion based at least in part on at least one of: respective traffic types of the reserved resource allocation and the other resource allocation, or respective priority levels associated with the reserved resource allocation and the other resource allocation; and/or the like. In some aspects, such means may include one or more components of base station 110 described in connection with FIG. 2.

As indicated above, FIG. 2 is provided merely as an example. Other examples may differ from what is described with regard to FIG. 2.

A resource (e.g., a set of resource elements, a set of resource blocks, a time resource, a frequency resource, a spatial resource, a code resource, and/or the like) may be used for a periodic communication. In such a case, it may be beneficial to reserve the resource for the periodic communication so that other communications are not scheduled during the resource. For example, a network (e.g., a network controller, a base station, a gNB, and/or the like) may configure a periodic resource allocation for an uplink or downlink communication with a UE using a semi-persistent scheduling (SPS) configuration, a configured grant (CG), and/or the like. As another example, the network may determine a traffic pattern (e.g., a period associated with the traffic pattern, a time offset associated with the traffic pattern, and/or the like) associated with high-priority traffic in the uplink or the downlink.

In some cases, a communication (e.g., a periodic communication to be communicated using a reserved resource) may not use an entire slot. For example, an instance of the communication may use a mini-slot, which may include fewer symbols (e.g., orthogonal frequency division multiplexing symbols) and/or resource blocks than are included in a slot. In such a case, the remaining symbols and/or resource blocks of the slot can be used for other resource allocations (e.g., for other UEs or for the same UE).

However, the UE may not know which resources are reserved resources. As used herein, a reserved resource may refer to a resource that is reserved for a periodic communication using SPS, CG, and/or the like. If the UE does not know which resources are reserved resources, there may be inefficiencies involved in using the remaining resources of a slot for another communication. For example, the network may need to use multiple resource allocations to use the remaining resources, as described in more detail in connection with FIG. 3. Thus, overhead associated with resource allocation may be increased and computing resources may be used in connection with reallocating the remaining resources of the slot.

Some techniques and apparatuses described herein provide signaling to identify a reserved resource to a UE (e.g., a UE to receive a communication using the reserved resource, or another UE). When the UE can determine which resources is a reserved resource, the UE can receive or transmit another communication based at least in part on the reserved resource. For example, when the other communication overlaps the reserved resource, the UE may receive or transmit the other communication without using the reserved resource (e.g., based at least in part on a rate matching technique). This may be particularly beneficial in the case when the reserved resource does not occupy an entire slot, since a single resource allocation for a communication occupying the remainder of the slot can be transmitted to the UE, and the UE can receive or transmit the communication without using the reserved resource (e.g., using the rate matching technique), as described in more detail in connection with FIG. 3. Thus, overhead associated with signaling resource allocations that overlap reserved resources is reduced and efficiency of resource allocation of the UE is improved.

Figure 3:
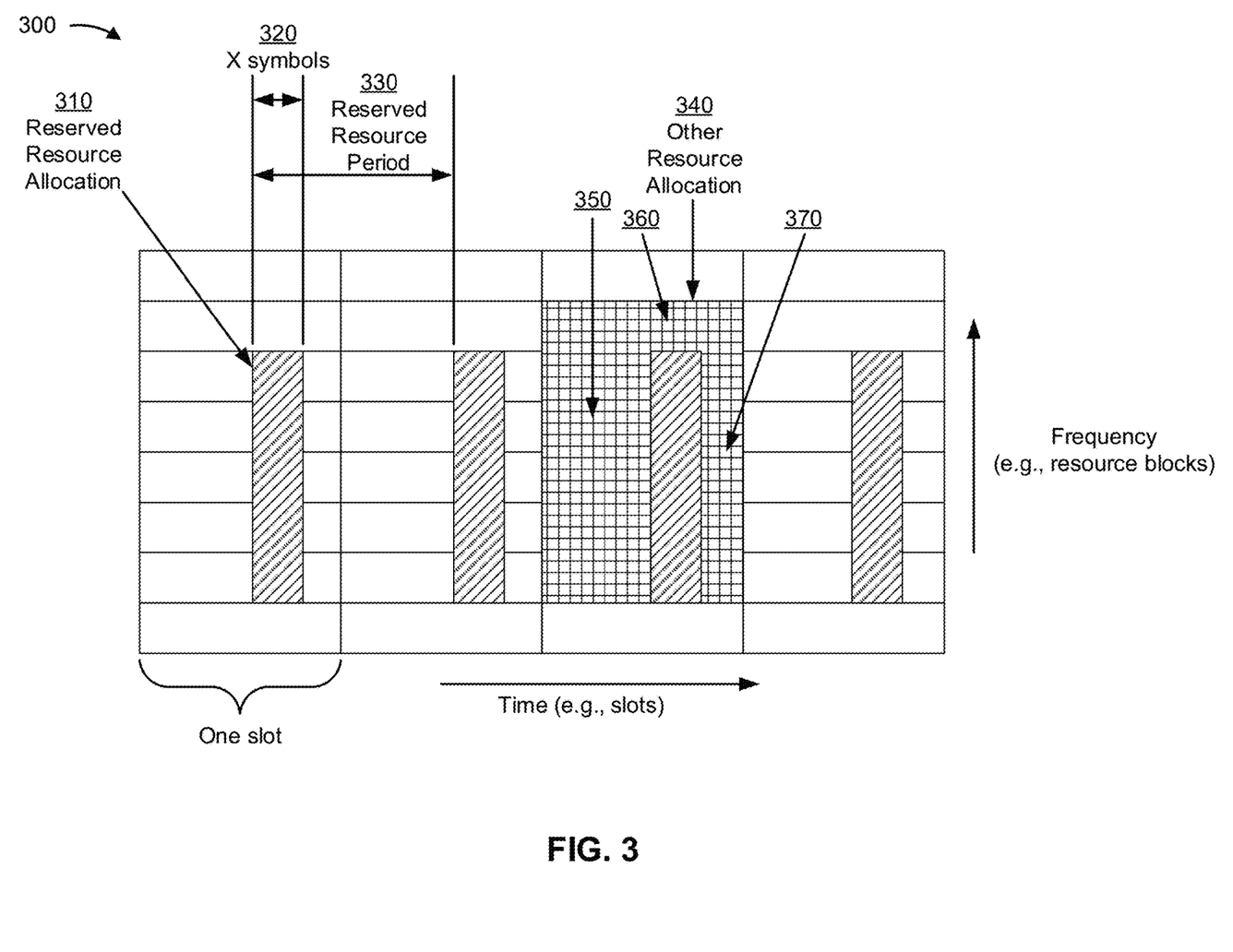
FIG. 3 is a diagram illustrating an example of a reserved resource allocation and another resource allocation that at least partially overlaps the reserved resource allocation, in accordance with various aspects of the present disclosure.

FIG. 3 is a diagram illustrating an example 300 of a reserved resource allocation and another resource allocation that at least partially overlaps the reserved resource allocation, in accordance with various aspects of the present disclosure. FIG. 3 shows an example of a set of resources for communication with one or more UEs (e.g., UE 120). The horizontal dimension represents time (e.g., slots, symbols, and/or the like), and the vertical dimension represents frequency (e.g., subcarriers, bandwidth parts, resource elements, resource blocks, and/or the like).

As shown by reference number 310, example 300 includes a reserved resource allocation (shown using diagonal hatching). In this case, the reserved resource allocation is associated with a periodic communication, which may be associated with an SPS configuration, a CG, a recurring communication, and/or the like. The techniques and apparatuses described herein are not limited to those involving periodic communications, and may be applied for aperiodic communications. The communication associated with the reserved resource allocation may be a downlink communication or an uplink communication.

As shown by reference number 320, the reserved resource allocation may use X symbols, wherein X is an integer. In some aspects, as shown, the reserved resource allocation may use less than all of a slot. Here, the reserved resource allocation is provided in a mini-slot of length Y, in which case Y is less than 14. As shown by reference number 330, the reserved resource allocation may be associated with a reserved resource period. Here, the reserved resource period is approximately 1 slot in length. However, the reserved resource period may be associated with any length or periodicity. In some aspects, the reserved resource may be associated with a priority level, as described in more detail elsewhere herein.

As shown by reference number 340, example 300 includes another resource allocation (shown using a square hatching). The other resource allocation may be for any communication other than the communication associated with the reserved resource. For example, the other communication may be an uplink communication (e.g., a physical uplink shared channel (PUSCH), a physical uplink control channel (PUCCH), and/or the like) or a downlink communication (e.g., a physical downlink shared channel (PDSCH), a physical downlink control channel (PDCCH), and/or the like). The other communication may be associated with the same UE as the communication associated with the reserved resource, or may be associated with a different UE than the communication associated with the reserved resource.

As shown, the other resource allocation occupies a remainder of a slot that includes a reserved resource (shown within the other resource allocation). Techniques and apparatuses described herein may provide for signaling of the reserved resource allocation to a UE (e.g., a UE that is to perform the other communication) so that the UE may transmit or receive the other communication based at least in part on the reserved resource allocation. For example, the UE may receive and process a communication based at least in part on an assumption that the communication does not use any of the reserved resources, or may transmit a communication without using any of the reserved resources. In some aspects, the UE may perform this transmission or reception using a rate matching technique with regard to the reserved resource. For example, the other communication may be rate matched around the reserved resource. Thus, the UE may communicate with the base station based at least in part on a reserved resource allocation and another resource allocation that overlaps the reserved resource allocation.

By signaling the reserved resource allocation to the UE, the base station may reduce signaling resources needed to provide the other resource allocation in the remainder of the slot. For example, if the UE does not know the reserved resource allocation, the base station may need to use two or more different resource allocations to allocate the remainder of the slot for the UE (e.g., a first resource allocation for the rectangle of the other resource allocation to the left of the reserved resource allocation shown by reference number 350, a second resource allocation for the rectangle of the other resource allocation above the reserved resource allocation shown by reference number 360, and a third resource allocation for the rectangle of the other resource allocation to the right of the reserved resource allocation shown by reference number 370). By signaling the reserved resource allocation to the UE and allowing the UE to rate match around the reserved resource allocation, the number of resource allocations required to convey the other resource allocation is reduced (e.g., to one), thereby improving efficiency of resource allocation and reducing resource allocation overhead, which conserves computing resources. A more detailed description of signaling of the reserved resource allocation and the other resource allocation, and communication based at least in part on these resource allocations, is provided in the description associated with FIG. 4.

As indicated above, FIG. 3 is provided as an example. Other examples may differ from what is described with respect to FIG. 3.

Figure 4:
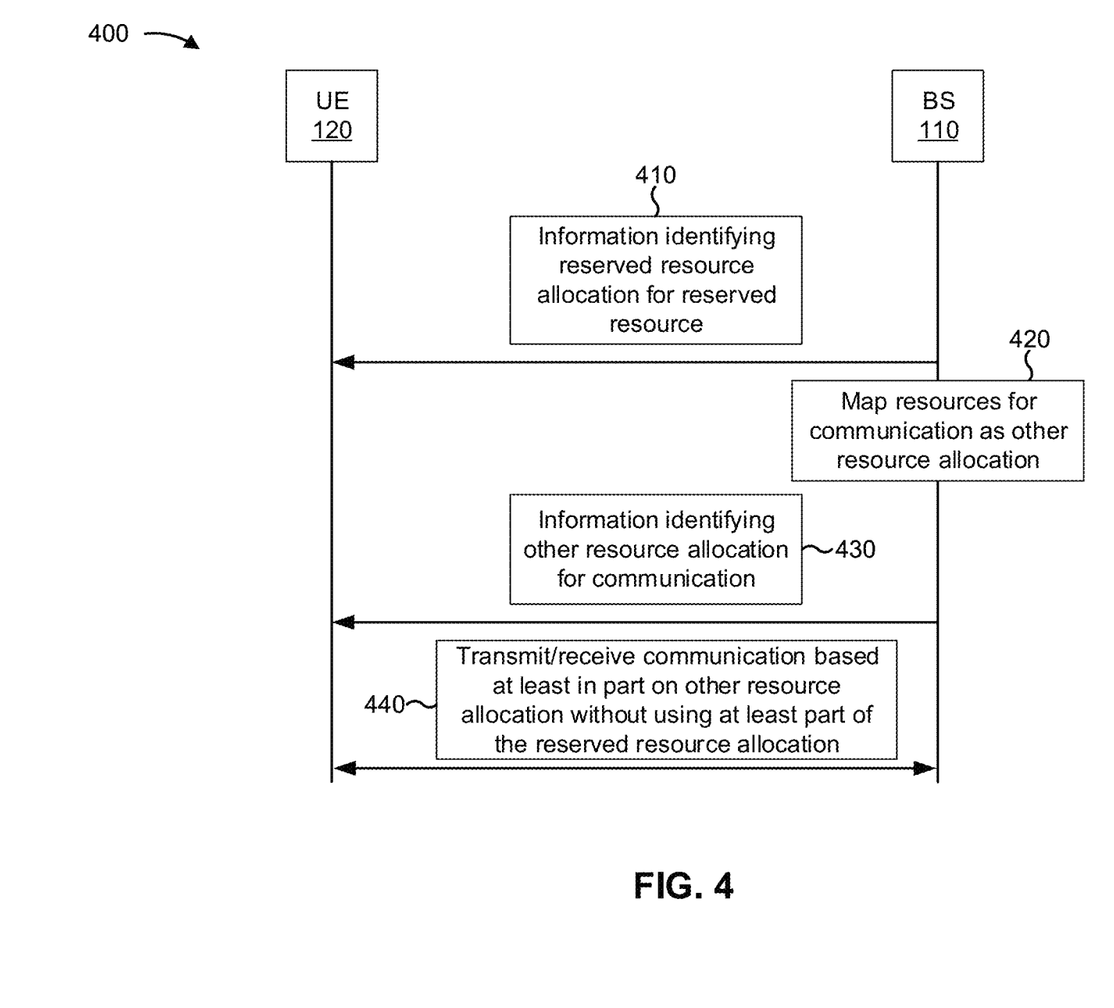
FIG. 4 is a diagram illustrating an example of signaling regarding a reserved resource allocation and another resource allocation for a communication, in accordance with various aspects of the present disclosure.

FIG. 4 is a diagram illustrating an example 400 of signaling regarding a reserved resource allocation and another resource allocation for a communication, in accordance with various aspects of the present disclosure.

As shown in FIG. 4, and by reference number 410, a BS (e.g., BS 110) may provide information identifying a reserved resource allocation (shown using the diagonal hatching in FIG. 3). The reserved resource allocation may be for one or more resource elements, and/or may repeat periodically. In some aspects, the BS may determine the information identifying the reserved resource allocation. In some aspects, another device (e.g., another BS, a network controller, and/or the like) may determine the information identifying the reserved resource allocation. In such a case, the other device may provide the information identifying the reserved resource allocation to the BS and/or the UE. In other words, the information identifying the reserved resource allocation and information identifying another resource allocation (described in more detail below) may or may not be determined and/or provided to the UE by the same device or set of devices.

In some aspects, the information identifying the reserved resource allocation may identify one or more parameters for the reserved resource allocation. For example, the information identifying the reserved resource allocation may identify a period of the reserved resource allocation, an offset (e.g., a frequency offset and/or a time offset) of the reserved resource allocation (e.g., relative to an absolute value or a reference value), particular resource element(s) and/or resource block(s) of the reserved resource allocation (e.g., a bitmap and/or the like), a priority level of the reserved resource allocation, a traffic type of the reserved resource allocation, and/or the like.

In some aspects, the information identifying the reserved resource allocation may be provided using a system information broadcast (e.g., a system information block and/or the like) associated with the reserved resource. In some aspects, the information identifying the reserved resource allocation may be provided using a radio resource control (RRC) message, which may include a unicast RRC message or a multicast RRC message. Using a unicast RRC message may conserve receiver resources of UEs that are not to receive the information identifying the reserved resource allocation, whereas using a multicast RRC message may conserve signaling resources of the base station. In some aspects, the information identifying the reserved resource allocation may be provided using a Layer 2 message, such as a medium access control (MAC) layer message. For example, the information identifying the reserved resource allocation may be provided using a MAC control element and/or the like for one or more downlink and/or uplink reserved resources. In some aspects, the information identifying the reserved resource allocation may be provided using a Layer 1 message, such as a physical (PHY) layer message. For example, the information identifying the reserved resource allocation may be provided using downlink control information and/or the like for one or more downlink and/or uplink reserved resources. In such cases, the Layer 1 message or the Layer 2 message may be a unicast message or a multicast message.

As shown by reference number 420, the BS may map resources for a communication as another resource allocation (shown using the square hatching in FIG. 3). The communication may include any communication to be received by or transmitted by the UE, such as a PDCCH, a PDSCH, a PUCCH, a PUSCH, and/or the like. The other resource allocation may at least partially overlap the reserved resource allocation. For example, the other resource allocation may include at least part of the reserved resource allocation, may share a slot with the reserved resource allocation, and/or the like.

In some aspects, the BS may map the resources for the communication based at least in part on the reserved resource allocation. For example, the BS may map the resources so that the resources of the other resource allocation are not mapped to a reserved resource. As another example, if the BS indicates a resource allocation for a PDSCH that overlaps a reserved resource allocation, the BS may map the resources of the PDSCH and/or transmit the PDSCH without using any resource of the reserved resource allocation. As yet another example, if the BS determines a resource allocation for a PUSCH or a PUCCH that overlaps a reserved resource allocation, the BS may map the resources of the PUSCH or the PUCCH so that the resources of the PUSCH or the PUCCH do not overlap the reserved resource allocation.

In some aspects, the BS may map the resources for the communication based at least in part on a priority level. For example, a communication associated with the reserved resource allocation and the communication associated with the other resource allocation may be associated with respective priority levels. As another example, each communication may be associated with a respective traffic type, and traffic types may have respective priority levels. The BS may map the resources based at least in part on the respective priority levels of the reserved resource allocation and the other resource allocation. For example, the BS may determine whether the other resource allocation is to be rate matched or is to be mapped to the reserved resources based at least in part on comparing the respective priority levels. In this way, the BS may map overlapping communications based at least in part on respective priority levels of the communications, thereby improving conformance with latency requirements, reliability requirements, and/or the like.

As used herein, a traffic type may include an ultra-reliable low latency communication (URLLC) traffic type, an enhanced mobile broadband (eMBB) traffic type, a best-effort traffic type, a low-latency traffic type, and/or the like. A priority level may be indicated using a quality of service (QoS) flow identifier or another type of indication. For example, the priority level may be associated with a particular logical channel priority, a traffic type of the communication, and/or the like. In some aspects, a traffic type and/or a priority level of a communication may be indicated using any suitable messaging format, such as downlink control information (DCI), RRC, MAC, and/or the like. In some aspects, a traffic type and/or priority level may be indicated in a DCI, CG, or SPS configuration associated with a communication.

As shown by reference number 430, the BS may provide information identifying the other resource allocation to the UE. For example, the BS may provide a grant, scheduling information, and/or the like, that identifies the other resource allocation. In some aspects, the information identifying the other resource allocation may identify a priority level associated with the other resource allocation. The UE may use the priority level associated with the other resource allocation and/or a priority level associated with the reserved resource allocation to determine how resources of the reserved resource allocation and the other resource allocation are to be mapped, as described in more detail elsewhere herein.

As shown by reference number 440, the BS and the UE may communicate (e.g., may transmit and/or receive a communication) based at least in part on the other resource allocation. As a first example, consider a PDSCH that overlaps a reserved resource allocation. In that case, the BS may transmit the PDSCH without using any reserved resources (e.g., using rate matching). The UE may receive the transmission from the BS, and may decode the transmission to obtain the PDSCH based at least in part on an assumption that the BS does not use any reserved resources for the PDSCH. As a second example, consider a PUSCH or PUCCH (PUSCH/PUCCH) that overlaps a reserved resource allocation. In that case, the UE may transmit the PUSCH/PUCCH without using any reserved resource (e.g., using rate matching). The BS may receive the transmission from the UE, and may decode the transmission to obtain the PUSCH/PUCCH based at least in part on an assumption that the UE does not use any reserved resources for the PUSCH/PUCCH.

In some aspects, the BS 110 and the UE 120 may communicate based at least in part on respective traffic types and/or respective priority levels of the reserved resource allocation and the other resource allocation. For example, the UE 120 and the BS 110 may determine which resource allocation, of the reserved resource allocation and the other resource allocation, is to use the overlapped portion of the resource allocations based at least in part on the respective traffic types and/or the respective priority levels. The BS 110 and the UE 120 may communicate using rate matching with regard to the reserved resource allocation and/or the other resource allocation based at least in part on determining which resource allocation is to use the overlapped portion of the resource allocations.

In this way, the BS may transmit information identifying a reserved resource allocation to the UE. The UE may communicate with the BS based at least in part on the information identifying the reserved resource allocation, thereby improving efficiency of resource allocation and reducing signaling overhead, which conserves computing resources.

As indicated above, FIG. 4 is provided as an example. Other examples may differ from what is described with respect to FIG. 4.

Figure 5:
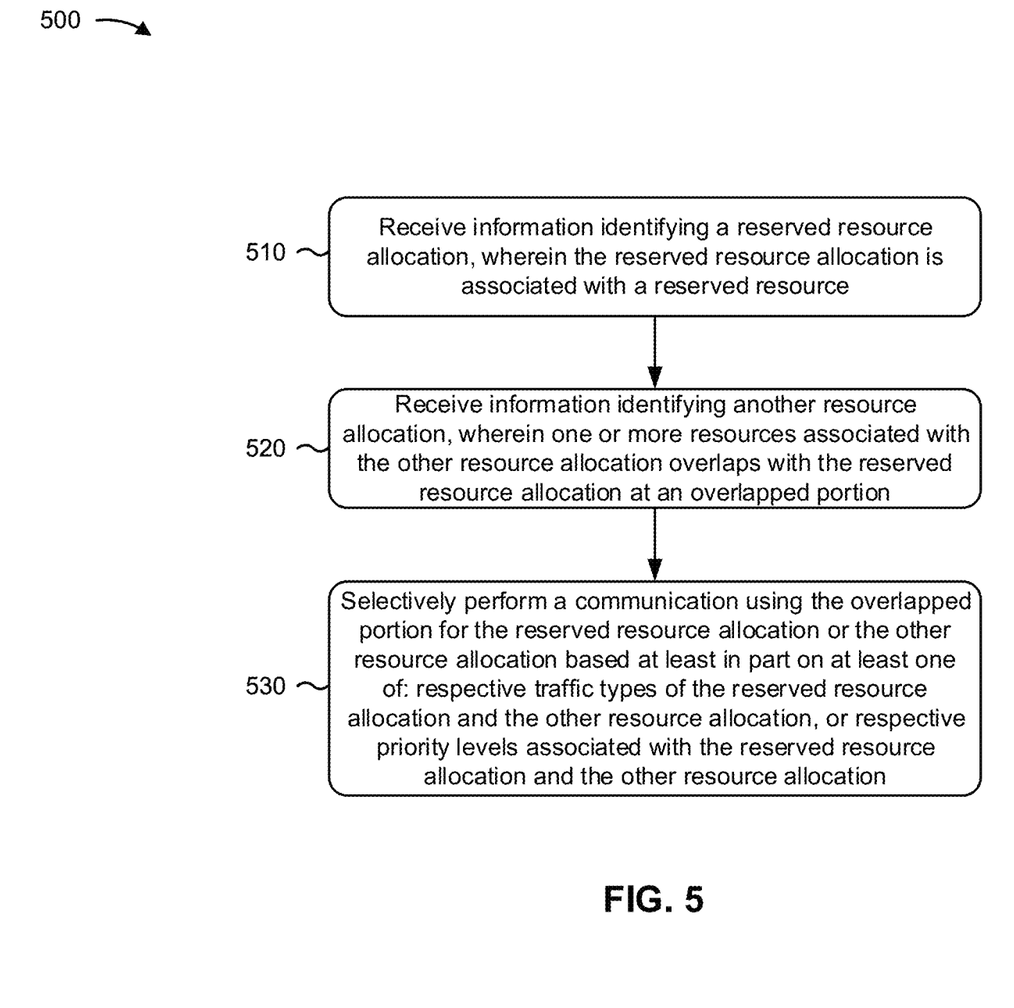
FIG. 5 is a diagram illustrating an example process performed, for example, by a user equipment, in accordance with various aspects of the present disclosure.

FIG. 5 is a diagram illustrating an example process 500 performed, for example, by a UE, in accordance with various aspects of the present disclosure. Example process 500 is an example where a UE (e.g., UE 120) performs signaling regarding a reserved resource allocation and another resource allocation for a communication.

As shown in FIG. 5, in some aspects, process 500 may include receiving information identifying a reserved resource allocation, wherein the reserved resource allocation is associated with a reserved resource (block 510). For example, the UE (e.g., using antenna 252, DEMOD 254, MIMO detector 256, receive processor 258, controller/processor 280, and/or the like) may receive information identifying a reserved resource allocation. The reserved resource allocation may be associated with a reserved resource.

As shown in FIG. 5, in some aspects, process 500 may include receiving information identifying another resource allocation, wherein one or more resources associated with the other resource allocation overlaps with the reserved resource allocation at an overlapped portion (block 520). For example, the UE (e.g., using antenna 252, DEMOD 254, MIMO detector 256, receive processor 258, controller/processor 280, and/or the like) may receive information identifying another resource allocation (e.g., another resource allocation). One or more resources associated with the other resource allocation may overlap with the reserved resource allocation at an overlapped portion. In some aspects, the reserved resource allocation may be at least partially included in the other resource allocation.

As shown in FIG. 5, in some aspects, process 500 may include selectively performing a communication using the overlapped portion for the reserved resource allocation or the other resource allocation based at least in part on at least one of: respective traffic types of the reserved resource allocation and the other resource allocation, or respective priority levels associated with the reserved resource allocation and the other resource allocation (block 530). For example, the UE (e.g., using controller/processor 280, transmit processor 264, TX MIMO processor 266, MOD 254, antenna 252, DEMOD 254, MIMO detector 256, receive processor 258, and/or the like) may selectively perform a communication using the overlapped portion for the reserved resource allocation or the other resource allocation. In other words, the overlapped portion may be used for one of the reserved resource allocation or the other resource allocation. The UE may selectively perform the communication based at least in part on respective traffic types of the reserved resource allocation and the other resource allocation and/or based at least in part on respective priority levels associated with the reserved resource allocation and the other resource allocation.

Process 500 may include additional aspects, such as any single aspect and/or any combination of aspects described below and/or in connection with one or more other processes described elsewhere herein.

In a first aspect, the UE may receive the information identifying the reserved resource allocation in a system information broadcast. In a second aspect, alone or in combination with the first aspect, the UE may receive the information identifying the reserved resource allocation in a radio resource control message, wherein the reserved resource allocation is for a downlink communication or an uplink communication. In a third aspect, alone or in combination with one or more of the first and second aspects, the reserved resource allocation is for a downlink communication and the radio resource control message is a multicast message. In a fourth aspect, alone or in combination with one or more of the first through third aspects, the reserved resource allocation is for an uplink communication and the radio resource control message is one of a unicast message or a multicast message. In a fifth aspect, alone or in combination with one or more of the first through fourth aspects, the UE may receive the information identifying the reserved resource allocation in a Layer 2 message. In a sixth aspect, alone or in combination with one or more of the first through fifth aspects, the UE may receive the information identifying the reserved resource allocation in a Layer 1 message. In a seventh aspect, alone or in combination with one or more of the first through sixth aspects, the Layer 1 message is one of a multicast message or a unicast message.

In an eighth aspect, alone or in combination with one or more of the first through seventh aspects, the communication comprises a communication on one of a downlink shared channel, an uplink control channel, or a downlink control channel. In a ninth aspect, alone or in combination with one or more of the first through eighth aspects, the UE may selectively perform the communication based at least in part on an explicit indication indicating whether the communication is to be performed using the overlapped portion for the reserved resource allocation or the other resource allocation. In a tenth aspect, alone or in combination with one or more of the first through eighth aspects, the other resource allocation comprises a single resource allocation.

In an eleventh aspect, alone or in combination with one or more of the first through tenth aspects, the information identifying the reserved resource allocation identifies at least one of: a period associated with the reserved resource, an offset associated with the reserved resource, a bitmap identifying one or more symbols, one or more slots, one or more resource elements, or one or more resource blocks of the reserved resource, or the priority level or the traffic type associated with the reserved resource. In a twelfth aspect, alone or in combination with one or more of the first through eleventh aspects, selectively performing the communication using the overlapped portion for the reserved resource allocation or the other resource allocation further comprises rate matching a resource allocation, of the reserved resource allocation or the other resource allocation, for which the overlapped portion is not used.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
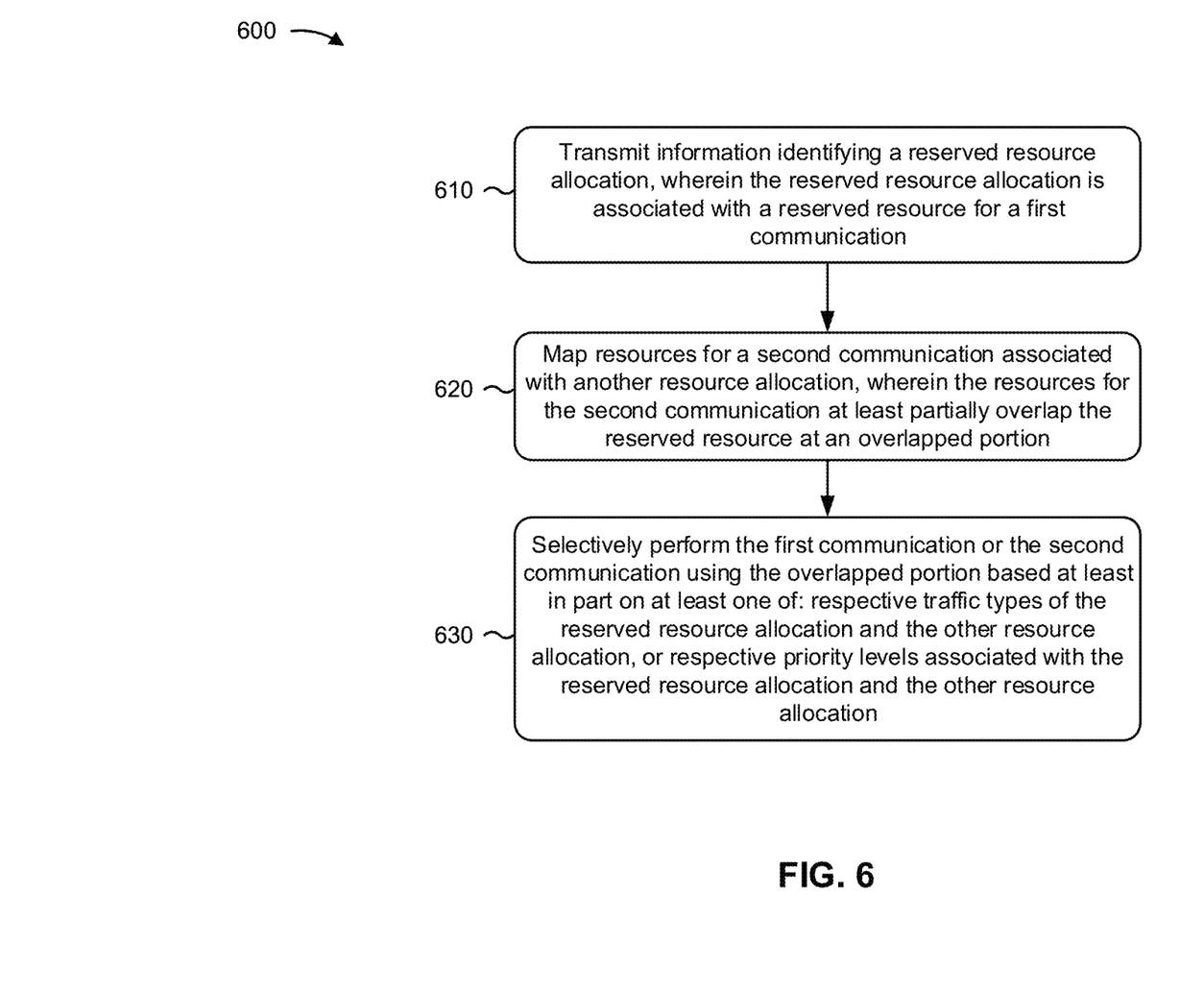
FIG. 6 is a diagram illustrating an example process performed, for example, by a base station, in accordance with various aspects of the present disclosure.

FIG. 6 is a diagram illustrating an example process 600 performed, for example, by a base station, in accordance with various aspects of the present disclosure. Example process 600 is an example where a base station (e.g., BS 110) performs signaling regarding a reserved resource allocation and another resource allocation for a communication.

As shown in FIG. 6, in some aspects, process 600 may include transmitting information identifying a reserved resource allocation, wherein the reserved resource allocation is associated with a reserved resource for a first communication (block 610). For example, the base station (e.g., using controller/processor 240, transmit processor 220, TX MIMO processor 230, MOD 232, antenna 234, and/or the like) may transmit information identifying a reserved resource allocation. The reserved resource allocation may be associated with a reserved resource for a first communication.

As shown in FIG. 6, in some aspects, process 600 may include mapping resources for a second communication associated with another resource allocation, wherein the resources for the second communication at least partially overlap the reserved resource at an overlapped portion (block 620). For example, the base station (e.g., using controller/processor 240, transmit processor 220, TX MIMO processor 230, MOD 232, antenna 234, and/or the like) may map resources for a second communication associated with another resource allocation. The resources for the second communication may at least partially overlap the reserved resource at an overlapped portion.

As shown in FIG. 6, in some aspects, process 600 may include selectively performing the first communication or the second communication using the overlapped portion based at least in part on at least one of: respective traffic types of the reserved resource allocation and the other resource allocation, or respective priority levels associated with the reserved resource allocation and the other resource allocation (block 630). For example, the base station (e.g., using controller/processor 240, transmit processor 220, TX MIMO processor 230, MOD 232, DEMOD 232, MIMO detector 236, receive processor 238, and/or the like) may selectively perform the first communication or the second communication using the overlapped portion. The base station may selectively use the overlapped portion for the first communication or the second communication based at least in part on at least one of respective traffic types of the reserved resource allocation and the other resource allocation, or respective priority levels associated with the reserved resource allocation and the other resource allocation.

Process 600 may include additional aspects, such as any single aspect and/or any combination of aspects described below and/or in connection with one or more other processes described elsewhere herein.

In a first aspect, the base station may transmit the information identifying the reserved resource allocation in a system information broadcast. In a second aspect, alone or in combination with the first aspect, the base station may transmit the information identifying the reserved resource allocation in a radio resource control message, wherein the first communication is a downlink communication or an uplink communication. In a third aspect, alone or in combination with one or more of the first and second aspects, the first communication is a downlink communication and the radio resource control message is a multicast message. In a fourth aspect, alone or in combination with one or more of the first through third aspects, the first communication is an uplink communication and the radio resource control message is one of a unicast message or a multicast message. In a fifth aspect, alone or in combination with one or more of the first through fourth aspects, the base station may transmit the information identifying the reserved resource allocation in a Layer 2 message. In a sixth aspect, alone or in combination with one or more of the first through fifth aspects, the base station may transmit the information identifying the reserved resource allocation in a Layer 1 message. In a seventh aspect, alone or in combination with one or more of the first through sixth aspects, the Layer 1 message is at least one of a multicast message or a unicast message.

In an eighth aspect, alone or in combination with one or more of the first through seventh aspects, the second communication comprises a communication on at least one of a downlink shared channel, an uplink control channel, or a downlink control channel. In a ninth aspect, alone or in combination with one or more of the first through eighth aspects, the base station may selectively perform the first communication or the second communication based at least in part on an explicit indication indicating whether the second communication is to be performed without using any resource of the reserved resource allocation.

In a tenth aspect, alone or in combination with one or more of the first through ninth aspects, the resources for the second communication comprise a single resource allocation. In an eleventh aspect, alone or in combination with one or more of the first through tenth aspects, the information identifying the reserved resource allocation identifies at least one of: a period associated with the reserved resource, an offset associated with the reserved resource, a bitmap identifying one or more symbols, one or more slots, one or more resource elements, or one or more resource blocks of the reserved resource, or a priority level or a traffic type associated with the reserved resource. In a twelfth aspect, alone or in combination with one or more of the first through eleventh aspects, selectively performing the first communication or the second communication using the overlapped portion further comprises rate matching a resource allocation, of the reserved resource allocation or the other resource allocation, for which the overlapped portion is not used.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving information identifying a reserved resource allocation, wherein the reserved resource allocation is associated with a reserved resource;
   receiving information identifying a different resource allocation, wherein the different resource allocation overlaps with the reserved resource allocation at an overlapped portion; and
   selectively performing a communication using the overlapped portion for the reserved resource allocation or the different resource allocation based at least in part on an explicit indication indicating whether the communication is to be performed using the overlapped portion for the reserved resource allocation or the different resource allocation.

2. The method of claim 1, wherein receiving the information identifying the reserved resource allocation further comprises:
   receiving the information identifying the reserved resource allocation in a system information broadcast.

3. The method of claim 1, wherein receiving the information identifying the reserved resource allocation further comprises:
   receiving the information identifying the reserved resource allocation in a radio resource control message, wherein the reserved resource allocation is for a downlink communication or an uplink communication.

4. The method of claim 3, wherein the reserved resource allocation is for a downlink communication and the radio resource control message is a multicast message.

5. The method of claim 3, wherein the reserved resource allocation is for an uplink communication and the radio resource control message is one of a unicast message or a multicast message.

6. The method of claim 1, wherein receiving the information identifying the reserved resource allocation further comprises:
   receiving the information identifying the reserved resource allocation in a Layer 2 message.

7. The method of claim 1, wherein receiving the information identifying the reserved resource allocation further comprises:
   receiving the information identifying the reserved resource allocation in a Layer 1 message.

8. The method of claim 7, wherein the Layer 1 message comprises one of:
   a multicast message, or
   a unicast message.

9. The method of claim 1, wherein the communication comprises a communication on one of:
   a downlink shared channel,
   an uplink control channel, or
   a downlink control channel.

10. The method of claim 1, wherein the different resource allocation comprises a single resource allocation.

11. The method of claim 1, wherein the information identifying the reserved resource allocation identifies at least one of:
    a period associated with the reserved resource,
    an offset associated with the reserved resource,
    a bitmap identifying one or more symbols, one or more slots, one or more resource elements, or one or more resource blocks of the reserved resource, or
    a priority level or a traffic type associated with the reserved resource.

12. The method of claim 1, wherein selectively performing the communication using the overlapped portion for the reserved resource allocation or the different resource allocation further comprises rate matching a resource allocation, of the reserved resource allocation or the different resource allocation, for which the overlapped portion is not used.

13. The method of claim 1, wherein the communication using the overlapped portion for the reserved resource allocation or the different resource allocation is selectively performed further based on a priority level associated with the reserved resource allocation or the different resource allocation.

14. A method of wireless communication performed by a base station, comprising:
    transmitting information identifying a reserved resource allocation, wherein the reserved resource allocation is associated with a reserved resource for a first communication;
    mapping resources for a second communication associated with a different resource allocation, wherein the resources for the second communication at least partially overlap the reserved resource at an overlapped portion; and
    selectively performing the first communication or the second communication using the overlapped portion based at least in part on an explicit indication indicating whether the second communication is to be performed without using any resource of the reserved resource allocation.

15. The method of claim 14, wherein transmitting the information identifying the reserved resource allocation further comprises:
    transmitting the information identifying the reserved resource allocation in a system information broadcast.

16. The method of claim 14, wherein transmitting the information identifying the reserved resource allocation further comprises:
    transmitting the information identifying the reserved resource allocation in a radio resource control message, wherein the first communication is a downlink communication or an uplink communication.

17. The method of claim 16, wherein the first communication is a downlink communication and the radio resource control message is a multicast message.

18. The method of claim 16, wherein the first communication is an uplink communication and the radio resource control message is one of a unicast message or a multicast message.

19. The method of claim 14, wherein transmitting the information identifying the reserved resource allocation further comprises:
    transmitting the information identifying the reserved resource allocation in a Layer 2 message.

20. The method of claim 14, wherein transmitting the information identifying the reserved resource allocation further comprises:

transmitting the information identifying the reserved resource allocation in a Layer 1 message.

21. The method of claim 20, wherein the Layer 1 message is at least one of:
   a multicast message, or
   a unicast message.

22. The method of claim 20, wherein the second communication comprises a communication on at least one of:
   a downlink shared channel,
   an uplink control channel, or
   a downlink control channel.

23. The method of claim 14, wherein the resources for the second communication comprise a single resource allocation.

24. The method of claim 14, wherein the information identifying the reserved resource allocation identifies at least one of:
   a period associated with the reserved resource,
   an offset associated with the reserved resource,
   a bitmap identifying one or more symbols, one or more slots, one or more resource elements, or one or more resource blocks of the reserved resource, or
   a priority level or a traffic type associated with the reserved resource.

25. The method of claim 14, wherein selectively performing the first communication or the second communication using the overlapped portion further comprises rate matching a resource allocation, of the reserved resource allocation or the different resource allocation, for which the overlapped portion is not used.

26. The method of claim 14, wherein the first communication or the second communication is selectively performed further based on a priority level associated with the reserved resource allocation or the different resource allocation.

27. A user equipment (UE) for wireless communication, comprising:
   a memory; and
   one or more processors operatively coupled to the memory, the memory and the one or more processors configured to:
      receive information identifying a reserved resource allocation, wherein the reserved resource allocation is associated with a reserved resource;
      receive information identifying a different resource allocation, wherein the different resource allocation overlaps with the reserved resource allocation at an overlapped portion; and
      selectively perform a communication using the overlapped portion for the reserved resource allocation or the different resource allocation based at least in part on an explicit indication indicating whether the communication is to be performed using the overlapped portion for the reserved resource allocation or the different resource allocation.

28. The UE of claim 27, wherein the communication using the overlapped portion for the reserved resource allocation or the different resource allocation is selectively performed further based on a priority level associated with the reserved resource allocation or the different resource allocation.

29. A base station for wireless communication, comprising:
   a memory; and
   one or more processors operatively coupled to the memory, the memory and the one or more processors configured to:
      transmit information identifying a reserved resource allocation, wherein the reserved resource allocation is associated with a reserved resource for a first communication;
      map resources for a second communication associated with a different resource allocation, wherein the resources for the second communication at least partially overlap the reserved resource at an overlapped portion; and
      selectively perform the first communication or the second communication using the overlapped portion based at least in part on an explicit indication indicating whether the second communication is to be performed without using any resource of the reserved resource allocation.

30. The base station of claim 29, wherein the first communication or the second communication is selectively performed further based on a priority level associated with the reserved resource allocation or the different resource allocation.

* * * * *